United States Patent [19]

Harmon

[11] 4,182,066
[45] Jan. 8, 1980

[54] DRIVEN DEVICE FOR DISLODGING FISH HOOK

[76] Inventor: John Harmon, 1840 E. 56th Ave., Anchorage, Ak. 99507

[21] Appl. No.: 894,077

[22] Filed: Apr. 6, 1978

[51] Int. Cl.² ............................................. A01K 97/00
[52] U.S. Cl. ...................................... 43/17.2; 43/26.1
[58] Field of Search ................... 43/17.2, 26.1, 26.2, 43/42.22; 294/66 R; 114/52

[56] References Cited

U.S. PATENT DOCUMENTS

| | | | |
|---|---|---|---|
| 1,854,906 | 4/1932 | Kulik | 294/66 R |
| 2,683,322 | 7/1954 | Clark | 43/17.2 |
| 3,357,124 | 12/1967 | Stepacoff | 43/42.22 X |
| 3,613,284 | 10/1971 | Anderson | 43/26.1 |
| 3,805,435 | 4/1974 | Serrill | 43/17.2 |

Primary Examiner—Nicholas P. Godici
Attorney, Agent, or Firm—Blum, Kaplan, Friedman, Silberman & Beran

[57] ABSTRACT

A device for dislodging a snagged fish hook which is especially suitable for use where the fishing line is at a shallow angle. The device has a self-contained propulsion system and may be clipped to the snagged line. The device will travel down the snagged line and upon contact dislodge the fish hook, the fish hook and device will then float to the surface and may be retrieved by the use of a second line. The buoyancy of the device may be adjusted by the user.

1 Claim, 2 Drawing Figures

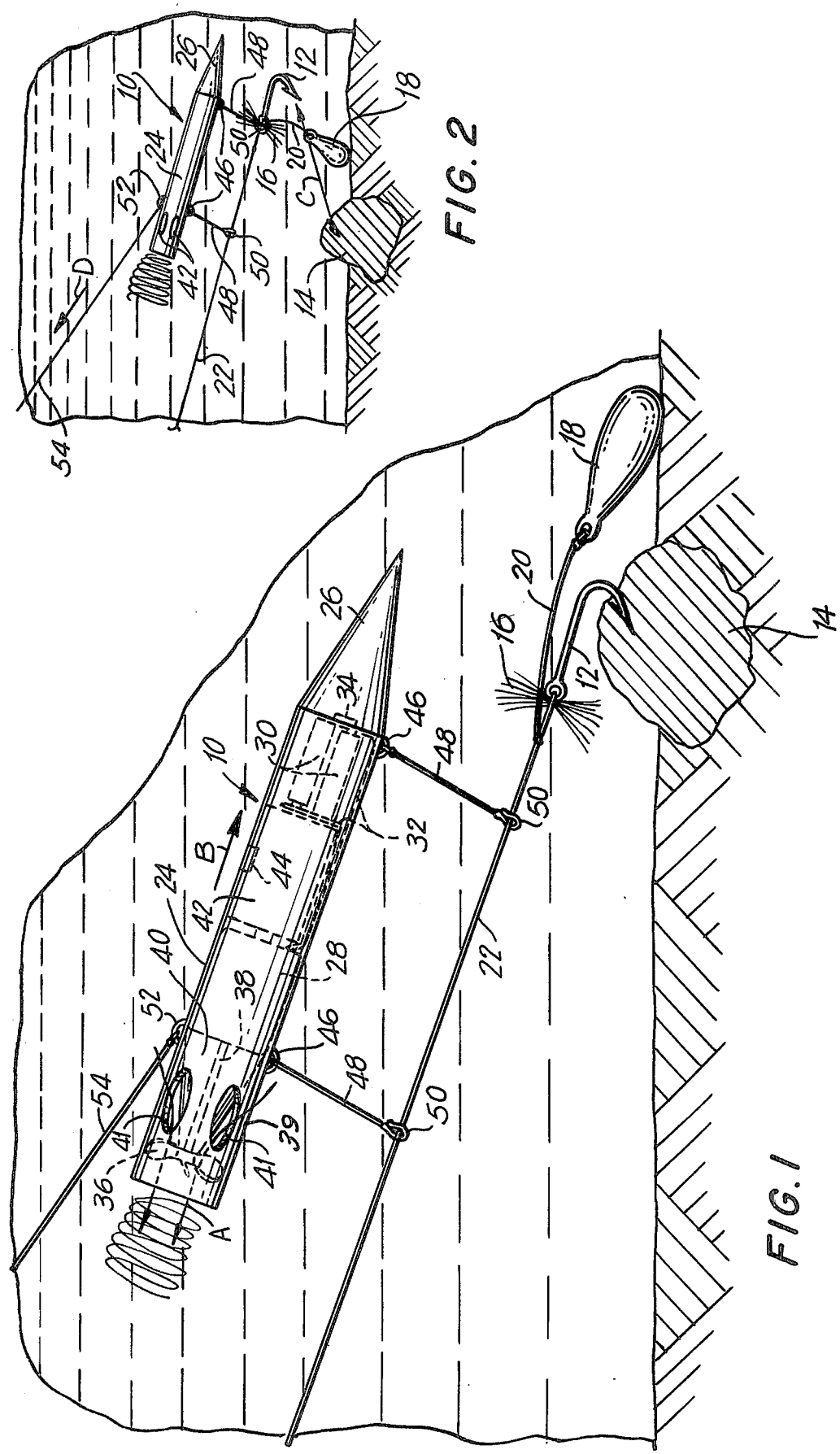

DRIVEN DEVICE FOR DISLODGING FISH HOOK

BACKGROUND OF THE INVENTION

One of the hazards in fishing is that the fish hook may become snagged by underwater debris. Any attempt to unsnag the hook by pulling on the attached line will merely increase the entanglement and, if the pull is too strong, the line will break and the hook and its attached fishing gear will be lost. In the art, a number of attempts have been made to provide devices for untangling snagged hooks. These devices have usually been of the "knocker" type in which a weight is attached to the snagged line which is pulled down by the force of gravity and which is "knocked" against the snagged hook in order to free it. However, since such devices are operated by gravity, they are not useful where the snagged line is at a very shallow angle. The present device provides for unsnagging of such lines regardless of the angle at which the line is snagged.

SUMMARY OF THE INVENTION

Generally speaking, in accordance with the invention, a device for dislodging an entangled fish hook is provided. The device has an elongated waterproof housing in which an electric motor and propeller to drive the device are disposed. The device has clip-on leaders for attachment to the snagged hook line. When turned on, the device will travel down the snagged line and upon contact with the hook will free it. The hook and device are then free to float to the surface and be retreived by a second line attached to the device. A compartment is provided which may be filled or emptied of water in order to adjust the bouyancy of the device.

Accordingly, it is an object of the invention to provide an improved device for dislodging an entangled fish hook where the snagged line is at a shallow angle.

Another object of this invention is to provide an improved device for dislodging an entangled fish hook that is self-powered.

A further object of this invention is to provide an improved device for dislodging an entangled fish hook that is simple to operate.

Still another object of this invention is to provide an improved device for dislodging an entangled fish hook in which the bouyancy of the device may be adjusted.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an elevational view of a device for dislodging an entangled fish hook shown in operation with internal components indicated in phanton; and FIG. 2 is an elevational view of the device in operation after the fish hook has been dislodged.

DETAILED DESCRIPTION OF THE PREFERRED EMBODIMENTS

The drawings generally illustrate at 10 a driven device for dislodging a fish hook 12 which has been snagged on a piece of debris 14. Fish hook 12 has an attached lure 16 and a sinker 18 which is attached by a line 20. A line 22 is the snagged line and extends to the fishing pole (not shown).

Device 10 has an elongated cylindrical body 24 which is hollow and a tapered nose cone 26. Mounted within cylindrical body 24 is an electric motor 28 which is powered by batteries 30 located at the forward end of body 24 and which are connected to motor 28 by means of wires 32. A switch 34 is used to turn motor 28 on and off. Motor 28 drives a propeller 36 through a drive shaft 38 disposed in a tapered member 40 which serves as a bearing for shaft 38 and a water tight seal for motor 28. Body 24 includes a shroud 39 surrounding propeller 36 which is provided with openings 41 to permit water to enter which will be displaced in direction A by the rotating action of propeller 36 which will drive the device in direction B down line 22.

Located between batteries 30 and motor 28 is hollow compartment 42 which may be used to adjust the buoyancy of the device through filling the compartment by means of water inlet 44. As more water is admitted to compartment 42, the device will become less buoyant.

The device 10 is attached to snagged line 22 by means of a pair of lower eyelets 46 which mount line leaders 48 which are joined to clip-on eyelets 50 which are clipped on to snagged line 22. An upper eyelet 52 serves to mount a retrieval line 54.

In use, to free a snagged line 22, a second line 54 is attached to upper eyelet 52 and clip-on eyelets 50 are placed on snagged line 22. Switch 34 is placed in the "on" position. A slight tension is taken up on snagged line 22 and the device is placed in the water. The device will travel down the snagged line until a line leader 48 contacts snagged hook 12. The driving force will displace snagged hook 12 in direction C away from debris 14 which will free hook 12 and its attached fishing gear from snagging and will be floated to the surface by means of the bouyancy of device 10. Device 10 and freed hook 12 may be returned by drawing line 54 in direction D. The bouyancy may be adjusted to lift the fishing gear by means of filling or emptying compartment 42.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A device for dislodging an entangled fish hook on a fishing line comprising a housing, said housing having a forward end and a rear end, said housing including a nose cone at its forward end, electrical supply means located in said housing proximate said forward end, a motor drive carried by said housing proximate said rear end, a propeller extending beyond said housing and operatively associated with said motor drive, a shroud affixed to said housing and surrounding said propeller, said shroud being provided with openings for the entry of fluid into said shroud, said openings being located forwardly of said propeller, electrical means including a switch electrically connecting said electrical supply means to said motor drive, a compartment within said housing of sufficient size to impart bouyancy to said device, fluid inlet means communicating with said compartment through said housing for selectively filling said compartment for adjusting the bouyancy of said device, a pair of leader lines attached to said housing at longitudinally spaced positions, one said leader line being attached rearwardly of said nose cone and the other leader line being attached forwardly of said shroud, connecting means on said leader lines for slidably connecting each said leader line to the fishing line, and connecting means carried by said housing for attaching a retriever line to said housing.

* * * * *